United States Patent [19]

Johnstun

[11] 4,191,405
[45] Mar. 4, 1980

[54] MARKER MANIFOLD

[76] Inventor: Dick E. Johnstun, 27472 Via Olmo, Mission Viejo, Calif. 92691

[21] Appl. No.: 19,907

[22] Filed: Mar. 12, 1979

[51] Int. Cl.² .......................... B32B 1/08; B32B 3/16; B41L 1/16; B41M 5/10
[52] U.S. Cl. ............................... 282/28 A; 282/28 R; 427/153; 428/36; 428/294; 428/421; 428/523; 428/914
[58] Field of Search .................. 282/14, 19 R, 28 R, 282/28 A; 427/153; 428/35, 36, 195, 201, 202, 211, 537, 913, 914, 421, 422, 522, 523, 294, 295

[56] References Cited
U.S. PATENT DOCUMENTS 3,924,879  12/1975  Wright ............................ 282/28 R
3,973,788   8/1976  Pekko et al. ..................... 282/28 R

*Primary Examiner*—Bruce H. Hess
*Attorney, Agent, or Firm*—William H. Maxwell

[57] ABSTRACT

A lamination of sheet material to be processed in a typewriter in the usual manner and within which is contained removable lengths of flattened heat shrink tubing releasably held in alignment by adhesive and exposed to a superimposed film of pressure transferable printing material, the laminations presenting a manifold and the front of which is lined to coincide with the placement of the shrink tubing for accurate imprinting of indicia thereon, the imprinted shrink tubing lengths being individually removable and applicable to the end portions of wiring to identify the same.

24 Claims, 3 Drawing Figures

U.S. Patent Mar. 4, 1980 4,191,405
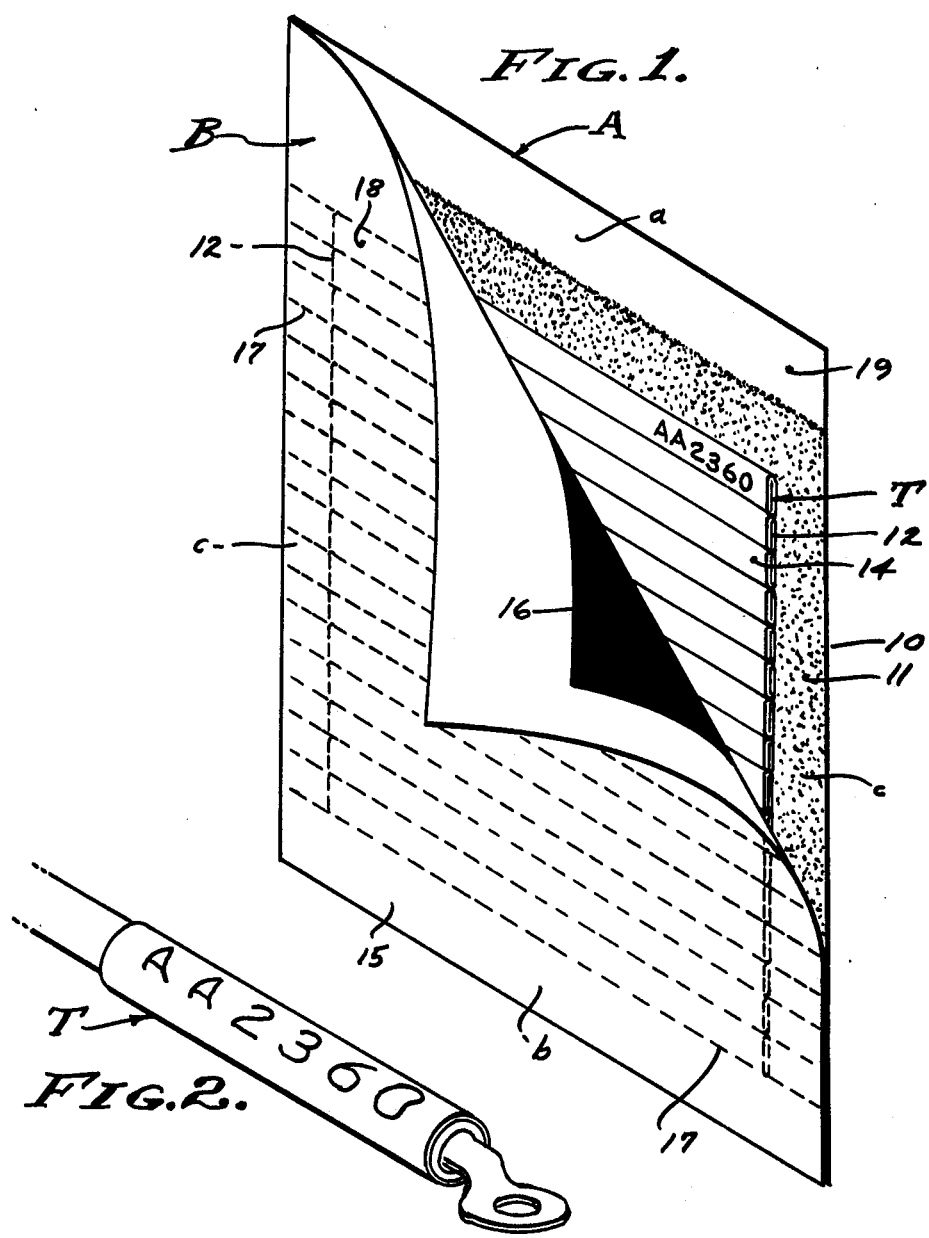

MARKER MANIFOLD

Reference is made to copending application Ser. No. 23,594 filed Mar. 20, 1979, entitled MARKER LAYUP.

BACKGROUND

Marker assemblies for labeling are well known, and especially the marking of shrink tubing to be applied to electrical wiring whereby identification can be made in the form of characters imprinted thereon. A widely used machine for imprinting characters is the typewriter, heretofore used to print upon marker assemblies comprised of heat shrink tubing held flat over cores or fillers inserted therein to substantially occupy the interior thereof preparatory to the imprinting of characters thereon. However, the insertion of cores and fillers has its limitations and special requirements in the typewriter construction. Firstly, the shrink tubing is limited in length, and secondly the typewriter platen must be specially adapted to the reception of the marker assembly with provision to drive the same. Therefore, it is a general object of this invention to provide a marker manifold for reception into a typewriter without modification thereto and for the application of indicia upon the shrink tubing, to be used by technicians in permanently identifying electrical conductors.

This invention is concerned with the imprinting of indicia onto markers to be applied over the ends of electrical wiring that requires identification. It is thin walled (0.010 inch) cross linked polymer tubing or the like, with which this invention is concerned, and which is available in soft initially cured roll form of large cross sectional diameter, and which is to be subjected to subsequent heat curing that reduces its diameter for constriction onto the wires to be identified, as circumstances require. The opacity and/or color of the tubing can vary, a white opaque tubing being widely employed. A problem arises in the imprinting of indicia onto such tubing, the roundness or cylindrical convexity making it difficult to imprint complete legible characters thereon. Heretofore, flattened cores or fillers have been inserted therein, but this process is restrictive whereas I have discovered that a partial shrink of the tubing while held flattened and through the application of controlled heat will harden the tubing sufficiently so that it will remain flat and pliable and conducive to being manifolded for insertion into a typewriter in the usually intended fashion. With the present invention, continuous lengths of flattened shrink tubing can be produced, and cut to any length desired. In practice therefore, the shrink tubing is cut to a length to occupy the full width of a manifold into which it is incorporated, said width being limited only by the length of the platen and/or typewriter carriage. In carrying out this invention, a plurality of flattened marker tubes are incorporated into a single manifold.

The imprinting of indicia onto plastic material is widely employed, and typewriters are available for this purpose, utilizing ribbon or tape (film) with pressure transferable material thereon which is applied by pressure onto said plastic surface. These transfer materials are well known and are referred to generally as ink or carbon, and it is available in sheets of film referred to generally as "carbon paper" or simply "carbon". It is an object therefore, to utilize such a film or carbon sheet as it is supplied for ordinary typewriters to manifold the same with one or more and preferably a plurality of shrink tubing sections held in alignment for imprinting utilizing conventional procedure therefor. With the present invention, the plurality of lengths of shrink tubing run from margin to margin, held in place to a backing lamina and over which is superimposed a lined carbon lamina (single or double layered as will be described). Therefore, the front face of the manifold is typed upon in the usual manner for correct reading, and the characters transferred simultaneously onto the underlying shrink tubing. In practice, the lined carbon lamina, the overlying lamina, is perforated so as to be torn off and sequentially expose the tubing lengths for removal from the backing lamina.

It is an object of this invention to provide a manifold of the character referred to wherein available materials are employed, processed as described herein and cooperatively joined into a combination wherein a plurality of markers can be imprinted in an ordinary typewriter and subsequently removed and shrunk onto wires to be identified. The margins of the manifolded laminae are joined by adhesive, releasable pressure adhesive of the type used for making removable tapes and the like, and all of which is sufficient to retain the integrity of the manifold and to ensure proper alignment of the lengths of shrink tubing therein.

SUMMARY OF INVENTION

This invention is concerned with the application of indicia to shrink tubing, and requires a flattened form thereof for insertion into a typewriter and held adjacent to the platen thereof for normal printing operations. Accordingly, the shrink tubing is flattened and cut to length, and a plurality thereof is arranged to extend between the side margins of a manifold in which they are removably incorporated and retained by a releasable adhesive. There is a backing lamina to which the individual lengths of shrink tubing are releasably applied with adhesive, and there is an overlying carbon lamina the front exterior of which is lined and/or perforated for coordinated typing alignment and sequential removal as may be required. The carbon lamina can be a two layer lamination.

DRAWINGS

The various objects and features of this invention will be fully understood from the following detailed description of the typical preferred form and application thereof, throughout which description reference is made to the accompanying drawings, in which:

FIG. 1 is a perspective view of the manifold with the front lamina peeled back so as to expose the flattened shrink tubing adhered to the backing lamina.

FIG. 2 is a perspective view illustrating the application of imprinted shrink tubing cut to a shorter length and constricted over a wire end to be identified.

FIG. 3 is an exploded sectional view showing the laminations of the manifold embracing the flattened shrink tubing.

PREFERRED EMBODIMENT

The usual typewriter is a machine for imprinting characters upon a sheet of paper, or in this case plastic material, and comprises a platen to back the impression of the type with an inverting carbon film that leaves a visible impression upon the sheet. There are variations in the machine design of typewriters, and the roll type of platen is universally employed for the reception of and line by line transport of the sheet upon which the printing is to be applied. It has been common practice to manifold sheets of paper in a typewriter, with carbon sheets therebetween, but there is a practical limit to the thickness of such a manifold. Accordingly, it is a general object herein to provide a marker manifold that is within the practical range of thickness and with frictional engagement that does not require any special drive or any modification of the typewriter platen. With the present invention, the flattened lengths of shrink tubing lie adjacent to each other and the plurality thereof is encased in back and front laminae that embrace the same for normal smooth operation through the typewriter machine.

This marker manifold is provided for the preparation of shrink tubing, prior to its constriction onto wire ends by curing with the application of heat. It is a cross linked polymer tubing in its partially cured state that is employed herein, two examples of which are irradiated and thermally stabilized modified polyvinylidene fluoride or polyolefin compound. The tubing is preformed from its initial circular cross section into a flattened condition by restricted application of controlled heat that advances the curing thereof for release of a portion of its memory and hardening the same into a constrained flattened configuration. In carrying out this invention, the initial thin walled plastic tubing is immersed in a heated liquid such as water and simultaneously compressed between turning rollers to flatten the same. This method is a continuous process followed by constrainment of the heat shrink tubing in a flattened condition while it cools after removal from the heated liquid, whereby the flatness thereof is retained. In practice, various sized tubing is employed, for example ¼ inch tubing having a wall thickness of 0.010 inch and immersed in 200° F. water a few seconds (approximations).

Referring now to the drawings, there is generally, a rectangular backing lamina A and a carbon faced lamina B, and between which there is a length of flattened shrink tubing T. The laminae and tubing are cooperatively joined by releasable adhesive as will be described, and all of which establishes the marker manifold for normal insertion into a typewriter, and marked with lines for alignment of the marker tubes T to receive imprinted indicia with accuracy.

The manifold is of "letter size" as shown and for purpose of example, although it can be of any or greater size as desired and capable of reception by the platen of the typewriter to be employed. Accordingly, the backing lamina A is for example 8½×11 inches with normal top a, bottom b and side margins C as shown. The top and bottom margins can be 1½ and 1 inch respectively, and the side margins ¾ inch respectively, in which case the transverse distance between the marginal portions is 7 inches. The flattened ¼ inch tubing is approximately ⅜ inch in width, so that twenty-four 7 inch lengths of marker tubes T can be accommodated within the margins described (FIG. 1 illustrates twelve lengths of larger marker tube T). In practice, the backing lamina A is a flat sheet of 0.004 inch paper 10 with pressure adhesive 11 applied coextensively to the top side thereof, a releasable adhesive that will hold to a plastic polymer and as well to an overlying paper lamina B.

The necessary frictional engagement of this manifold with the roller platen of the typewriter is by means of a cover coating 11' applied longitudinally of the back thereof, for example a rubber base material applied in a dry thin layer (not tacky) and which forms a "non-skid" surface that will not slip with respect to the surface of the platen engageably advancing the manifold to position the same. The coating 11' can be applied as one or more strips, or coextensively over the back side of the backing lamina A.

The assembly process requires the orientation and pressure application of a plurality of marker tubes T, arranged as hereinabove stated and in flattened condition as described. The marker tubes T are cut to equal length with normal ends 12 and with the bottom sides 13 adhered to the pressure adhesive 11 and with the top sides 14 exposed toward the front of the manifold, the number of tubes being placed side by side adjacent one to the other.

The carbon faced lamina or laminae B is applied by pressure application over the plurality of marker tubes T arranged upon the backing lamina A and adhered to the marginal portions a, b and c. The carbon faced lamina is a flat sheet of 0.004 inch paper 15 coextensive with backing sheet 10 to overlie the same with the plurality of marker tubes T therebetween. It is the bottom side of the lamina B that carries the carbon 16 to coextensively overlie the plurality of marker tubes T, the pressure transferable material or carbon 16 being deposited on the bottom side of paper 15, or alternately applied thereto as a film lamina. It is preferred that the carbon 16 stop short of the marginal portions, or with an overlap, so that the paper sheets 10 and 15 adhere directly together throughout their complementary marginal portions.

In accordance with this invention, the precise placement of the marker tubes T extending transversely between the laminae A and B is coordinated with the typed indicia to be applied by the typewriter. Therefore, each line of marker tube adjacency is indicated by a corresponding line 17 disposed transversely of the front of the manifold across the top face of lamina B between the side marginal portions thereof. A feature is that the lines 17 are perforated lines whereby strips 18 of lamina B are separable consecutively to expose individual marker tubes that have been imprinted. The perforated lines 17 extend the length of the marker tubes T and between the two side edges of the lamina B.

From the foregoing it will be seen that the marker manifold is flexible and pliable in all directions the same as a manifold of papers, thereby to be manipulated into a typewriter in the usual manner. Accurate alignment of the marker tubes T is made possible by the lines 17, whereby the indicia is centered on the top side 14 thereof by centering the type impressions at the center of the complementary overlying strips 18. Each impression is visible on the front of the manifold lamina B, while simultaneously transferring that impression onto the top side 14 of the marker tube. Removal of the marker tube T is facilitated by tearing off each or as many strips 18 as may be required to expose the marker tube or tubes for removal, by stripping them from the releasable adhesive on the top face of the backing lamina A. As indicated, adhesive is omitted from a part of the top margin at 19, so as to facilitate separation of the lamina. The individual imprinted marker strips are then peeled out and cut into sections as required and opened by manipulation and slipped over wire ends and heat applied for constriction into final working position (see FIG. 2). The marker manifold can be used one or more strips 18-marker tubes T at a time, and packaged and stored flat with no danger of damage by distortion, nominal care being made to avoid accidental impressions.

Having described only a typical preferred form and application of my invention, I do not wish to be limited or restricted to the specific details herein set forth, but wish to reserve to myself any modifications or variations that may appear to those skilled in the art as set forth within the limits of the following claims.

I claim:

1. A manifold embracing a heat shrink marker tube for imprinting, and including;
   a flexible backing lamina of elongate sheet form and having at least one marginal portion,
   a flexible marker tube of partially cured cross-linked polymer tubing hardened into a constrained flattened configuration and secured over the backing lamina by means of a releasible pressure sensitive adhesive,
   and a flexible carbon faced front lamina coextensively overlying the flattened marker tube and with at least one marginal portion overlying said at least one marginal portion of the backing lamina, and with the carbon facing the said marker tube,
   the said at least one marginal portions of the laminae being releasably secured one to the other by pressure adhesive.

2. The manifold embracing a marker tube as set forth in claim 1, wherein the said at least one marginal portion of the lamina extends along a side.

3. The manifold embracing a marker tube as set forth in claim 1, wherein the top portion of the backing lamina is coextensively coated with releasable pressure adhesive for securement of the marker tube and said at least one marginal portion thereof.

4. The manifold embracing a marker tube as set forth in claim 1, wherein the back of the backing lamina has a cover coating longitudinally thereof comprised of a thin layer of friction material.

5. The manifold embracing a marker tube as set forth in claim 1, wherein the top portion of the backing lamina is coextensively coated with releasable pressure adhesive for securement of the marker tube and said at least one marginal portion thereof, and wherein the back of the backing lamina has a cover coating longitudinally thereof comprised of a thin layer of friction material.

6. The manifold embracing a marker tube as set forth in claim 1, wherein the cross-linked polymer of the marker tube is polyvinylidene fluoride hardened into said constrained flattened configuration.

7. The manifold embracing a marker tube as set forth in claim 1, wherein the marker tube is cross-linked polymer of modified polyolefin hardened into said constrained flattened configuration.

8. The manifold embracing a marker tube as set forth in claim 1, wherein the carbon facing the said marker tube is a layer of material applied to the front lamina.

9. The manifold embracing a marker tube as set forth in claim 1, wherein the carbon facing the said marker tube is a film disposed between the front lamina and said marker tube.

10. The manifold embracing a marker tube as set forth in claim 1, wherein the carbon facing the said marker tube is a film laminated to the front lamina and opposed to said marker tube.

11. The manifold embracing a marker tube as set forth in claim 1, wherein the said at least one marginal portion of the lamina extends along a side, wherein the backing lamina is coextensively coated with releasable pressure adhesive for securement of the marker tube and said at least one marginal portion thereof, wherein the back of the backing lamina has a cover coating longitudinally thereof comprised of a thin layer of friction material, and wherein the carbon facing the said marker tube is a film laminated to the front lamina and opposed to said marker tube.

12. A manifold embracing heat shrink marker tubes for insertion into a typewriter and the like, and including;
   a flexible backing lamina of rectangular sheet form and having marginal portions,
   a plurality of flexible marker tubes of partially cured cross-linked polymer tubing hardened into a constrained flattened configuration and with adjacent edges and secured to extend transversely over the backing lamina by means of a releasible pressure sensitive adhesive,
   and a flexible carbon faced front lamina coextensively overlying the plurality of flattened marker tubes and with marginal portions overlying said marginal portions of the backing lamina, and with the carbon facing the said marker tubes,
   the said marginal portions of the laminae being releasably secured one to the other by pressure adhesive.

13. The manifold marker tubes as set forth in claim 12, wherein the said marginal portions of the laminae extend along sides thereof.

14. The manifold marker tubes as set forth in claim 12, wherein the said marginal portions of the laminae extend along the top and bottom and opposite sides thereof.

15. The manifold marker tubes as set forth in claim 12, wherein the top portion of the backing lamina is coextensively coated with releasable pressure adhesive for securement of the plurality of marker tubes and top marginal portions of the laminae.

16. The manifold marker tubes as set forth in claim 12, wherein the back of the backing lamina has a cover coating longitudinally thereof comprised of a thin layer of friction material.

17. The manifold marker tubes as set forth in claim 12, wherein the top portion of the backing lamina is coextensively coated with releasable pressure adhesive for securement of the marker tube and said at least one marginal portion thereof, and wherein the back of the backing lamina has a cover coating longitudinally thereof comprised of a thin layer of friction material.

18. The manifold marker tubes as set forth in claim 12, wherein the cross-linked polymer of said plurality of marker tubes is modified polyvinylidene fluoride hardened into said constrained flattened configuration.

19. The manifold marker tubes as set forth in claim 12, wherein the cross-linked polymer of said plurality of marker tubes is modified polyolefin hardened into said constrained flattened configuration.

20. The manifold marker tubes as set forth in claim 12, wherein the carbon facing the said marker tubes is a layer of material applied to the front lamina.

21. The manifold marker tubes as set forth in claim 12, wherein the carbon facing the said marker tubes is a film disposed between the front lamina and said marker tubes.

22. The manifold marker tubes as set forth in claim 12, wherein the carbon facing the said marker tubes is a film laminated to the front lamina and opposed to said marker tubes.

23. The manifold marker tube as set forth in claim 12, wherein the carbon faced front lamina is lined at the corresponding underlying lines of marker tube adjacency.

24. The manifold marker tube as set forth in claim 12, wherein the carbon faced front lamina is lined with perforations of separation at the corresponding underlying lines of marker tube adjacency.

* * * * *